United States Patent [19]

Oslapas et al.

[11] Patent Number: 5,004,063
[45] Date of Patent: Apr. 2, 1991

[54] STEERING SYSTEM FOR THE REAR WHEELS OF A VEHICLE

[75] Inventors: Algis Oslapas, Dearborn Heights; Manfred Rumpel, Birmingham, both of Mich.

[73] Assignee: Ford Motor Company, Dearborn, Mich.

[21] Appl. No.: 290,209

[22] Filed: Dec. 27, 1988

[51] Int. Cl.⁵ ............................................. B62D 7/14
[52] U.S. Cl. .................. 180/79.1; 180/140; 280/91
[58] Field of Search .............. 180/79.1, 140, 142; 280/91, 98, 99

[56] References Cited

U.S. PATENT DOCUMENTS

| | | | |
|---|---|---|---|
| 4,105,086 | 8/1978 | Ishii et al. | 180/79 |
| 4,566,711 | 1/1986 | Koizumi et al. | 280/91 |
| 4,657,102 | 4/1987 | Kanazawa et al. | 180/140 |
| 4,669,567 | 6/1987 | Nakamura et al. | 280/91 X |
| 4,669,744 | 6/1987 | Sano et al. | 280/99 |
| 4,671,523 | 6/1987 | Naumann | 280/91 |
| 4,673,189 | 6/1987 | Kanazawa et al. | 280/91 |
| 4,705,135 | 11/1987 | Kawamoto et al. | 180/236 |
| 4,768,602 | 9/1988 | Inoue et al. | 280/91 |
| 4,779,693 | 10/1988 | Takahashi et al. | 280/91 |
| 4,893,688 | 1/1990 | Morishita | 280/91 |

FOREIGN PATENT DOCUMENTS 78870  5/1985  Japan ............................ 280/91

Primary Examiner—Mitchell J. Hill
Attorney, Agent, or Firm—Jerome R. Drouillard; Roger L. May

[57] ABSTRACT

A steering system for the rear wheels of a vehicle with the steering gear including a motor drive for positioning the rear wheels and a control mechanism for operating the steering gear and including apparatus responsive to a sensed vehicular operating parameter for overriding the steering gear motor drive so as to prevent the steering gear from exceeding a predetermined fractional component of the angular range of steering authority.

11 Claims, 3 Drawing Sheets

STEERING SYSTEM FOR THE REAR WHEELS OF A VEHICLE

BACKGROUND OF THE INVENTION

1. Field of the Invention

This invention relates to a steering system for the rear wheels of a vehicle, and more particularly to a subsystem for selectively overriding the rear steering system prime mover so as to prevent the rear steering gear from exceeding a predetermined fractional component of its total angular range in the event that the operating condition of the vehicle warrants such limitation.

2. Disclosure Information

Rear wheel steering systems typically respond to steering of the front wheels of the vehicle. Certain systems respond to other vehicle inputs such as steering torque, vehicle speed, transmission gear or other parameters.

U.S. Pat. No. 4,671,523 discloses a system which immobilizes the rear steering gear in response to inputs from a steering torque sensor associated with the front wheels and a front wheel turn angle sensor. The system of the '523 patent limits the usefulness of the rear steering system because it is capable only of disabling the rear steering gear entirely; it will not serve to restrict the range of authority of the steering gear while still allowing a limited steering capability of the rear steering gear.

U.S. Pat. No. 4,566,711 and U.S. Pat. No. 4,705,135 disclose shaft-driven rear wheel steering systems in which a drive shaft couples the front and rear steering gears of a vehicle. The '711 and '135 patents further disclose motor operated devices for changing the front-to-rear steering ratio. In the event that these motor-driven ratio changing devices were to malfunction, a serious problem could be encountered by the driver because the driver could be unaware of the resetting of the front-to-front/rear steering ratio, and as a result, vehicle handling changes could cause a loss of vehicle control.

U.S. Pat. No. 4,105,086 and U.S. Pat. No. 4,657,102 disclose another type of system in which the power for actuating the rear wheel steering system is derived from a hydraulically controlled means. The '086 patent discloses a linkage-operated system, whereas the '102 patent discloses a purely hydraulically operated system. Each of the systems disclosed in the '086 and '102 patents suffers from a potential infirmity inasmuch as a malfunction in the control hydraulics of the systems could cause an unexpected slewing of the rear wheels in one direction or another, with concomitant loss of vehicle control.

It is an object of the present invention to provide a system for selectively limiting the range of authority of a rear wheel steering gear.

It is an advantage of the present invention that a steering system according to this invention will have a limited capacity to steer the rear wheels once the vehicle has exceeded a threshold speed.

It is a further advantage of the present invention that a rear wheel steering gear according to this invention will not impair vehicle control even if the steering gear's control system becomes disabled.

Other objects, features and advantages of the invention will become apparent to the reader of the specification.

SUMMARY OF THE INVENTION

According to the present invention, a steering system for the rear wheels of a vehicle comprises a steering gear for steering the rear wheels within an angular range of authority, with the steering gear comprising a motor drive for positioning the rear wheels. A steering system according to this invention further comprises control means for operating the steering gear, with the control means comprising means for sensing at least one vehicle operating parameter and means responsive to the sensed parameter for overriding the steering gear's motor drive so as to prevent the steering gear from exceeding a predetermined fractional component of the angular steering range of authority. The sensed operating parameter may comprise the velocity of the vehicle so that the steering capability of the motor drive within the rear steering gear will be limited according to the velocity of the vehicle. Alternatively, the sensed operating parameter may comprise the transmission gear in which the vehicle is being operated so that the steering capability of the motor drive will be limited according to the transmission operating condition.

A motor drive employed with a system according to the present invention may comprise an electric motor driving a gear set operatively connected with the rear wheels of the vehicle. In one embodiment, a steering system for the rear wheels of a vehicle according to the present invention comprises a motor driven, dual-range steering gear for steering the rear wheels, with the steering gear being operable within greater and lesser ranges of authority, with each such range corresponding to a different predetermined maximum steering angle, and control means for operating the steering gear, with the control means comprising means for sensing the speed of the vehicle and means responsive to the sensed vehicle speed for preventing the motor drive from exceeding the maximum steering angle corresponding to the lesser range in the event that a threshold speed has been exceeded. The means for preventing the motor drive from exceeding the prescribed maximum steering angle corresponding to the lesser range may comprise a limit mechanism for impeding the motion of the steering gear. This limit mechanism may comprise an electromechanical travel limiting block adapted to interact with the sliding member contained within the steering gear.

DESCRIPTION OF THE PREFERRED EMBODIMENTS

Figure 1:
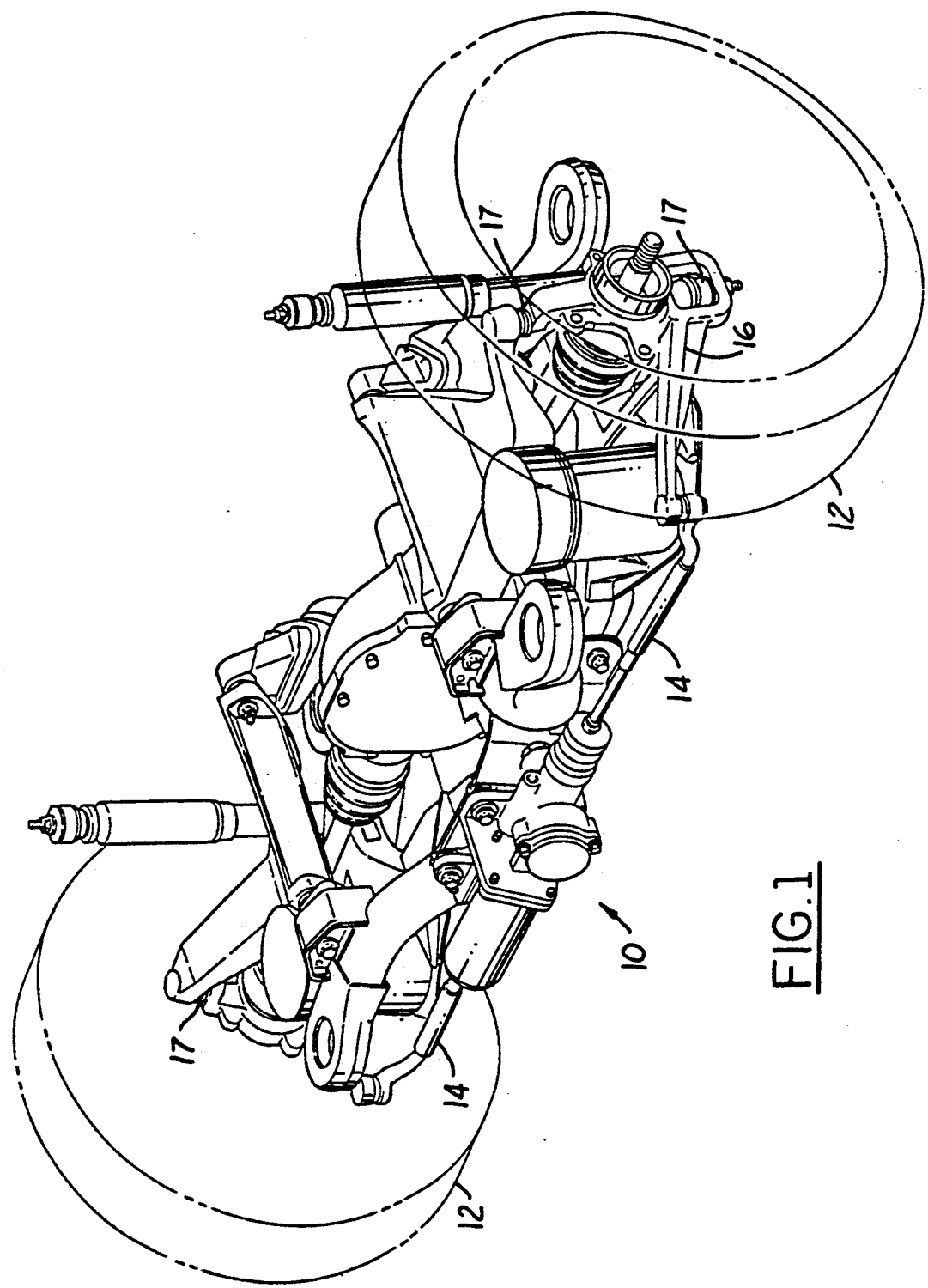
FIG. 1 is a perspective view of a steering system for the rear wheels of a vehicle according to the present invention.

As shown in FIG. 1, rear steering gear 10 is coupled to a pair of spindles, 16, by means of tie rods, 14. Accordingly, as the tie rods are driven reciprocably by steering gear 10, road wheels 12 will be caused to rotate about the kingpin axes defined by ball joints 17 and as a result road wheels 12 will be steered by steering gear 10.

Figure 2:
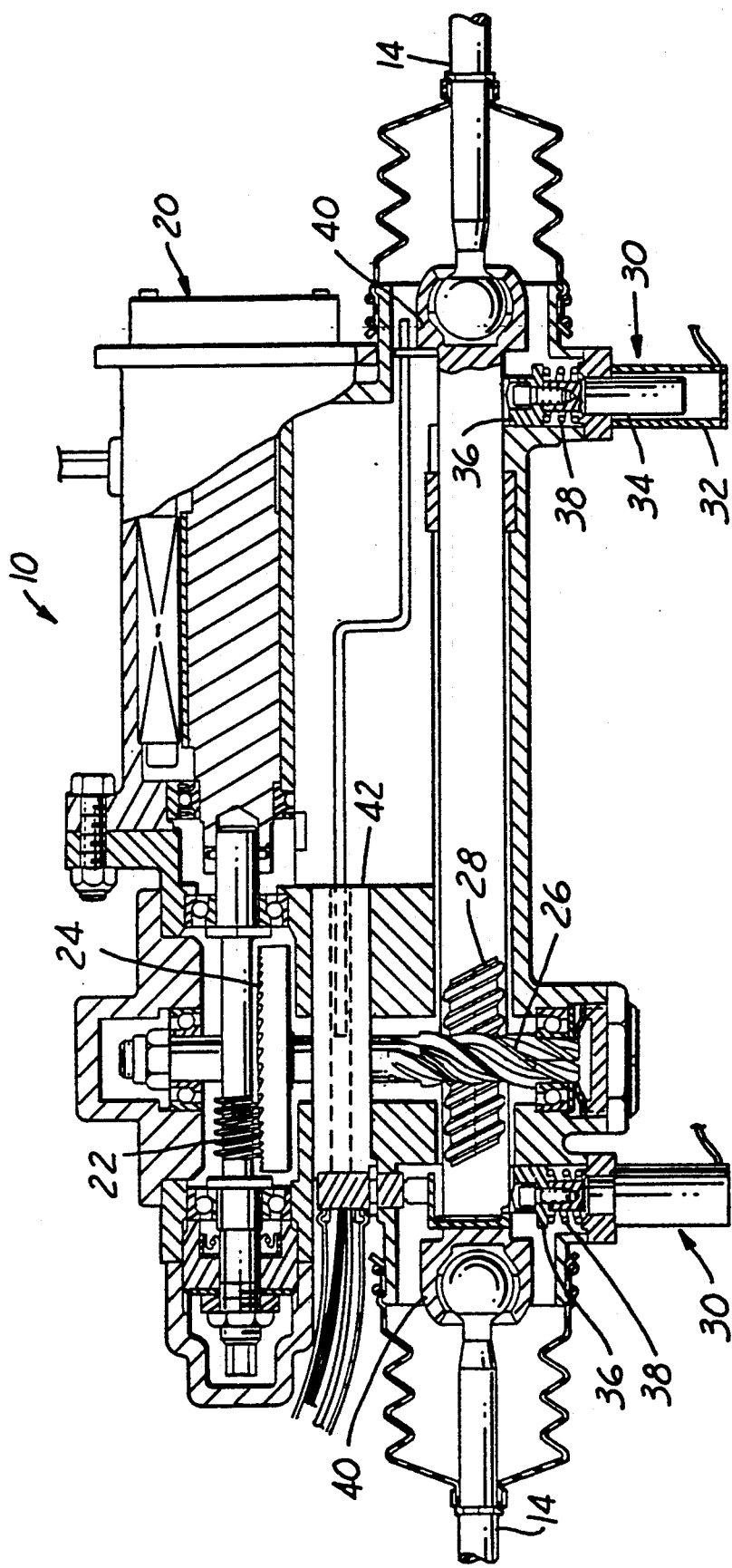
FIG. 2 is a cutaway view of a rear steering gear according to the present invention.

FIG. 2 illustrates the internal parts of a steering gear suitable for use with a system according to the present invention. Those skilled in the art will appreciate that a system according to the present invention would be useful not only with the illustrated gear but also with other types of steering gears employing hydraulic, mechanical or electrical operating systems and prime movers.

The steering gear shown in FIG. 2 has an electrically driven prime mover. Accordingly, motor 20 drives motor pinion 22, which in turn meshes with face gear 24. The face gear is mounted to a common shaft with rack pinion 26, which in turn meshes with teeth formed on rack 28. Accordingly, as motor 20 revolves, rack 28 will reciprocate. An inner tie rod end, 40, is mounted at either end of rack 28. These tie rod ends allow tie rods 14 to be mounted to steering gear 10.

During operation of a rear wheel steering system according to this invention, control module 18 (FIG. 3) will receive inputs from rear steering gear position sensor 42, which in this case comprise a linear variable differential transformer (LVDT). The LVDT is coupled between rack 28 and the steering gear's housing so that reciprocation of the rack will be accompanied by a change in the voltage level of the signal which is output by the LVDT. Control module 18 also receives inputs from front steering gear position sensor 44, vehicle speed sensor 46 and transmission gear sensor 48. Those skilled in the art will appreciate in view of this disclosure that a system according to the present invention could be employed with or without speed sensor 46 or transmission gear sensor 48. It will be further appreciated that a system according to the present invention could be employed with yet other types of sensors capable of detecting appropriate vehicular operating parameters.

Figure 3:
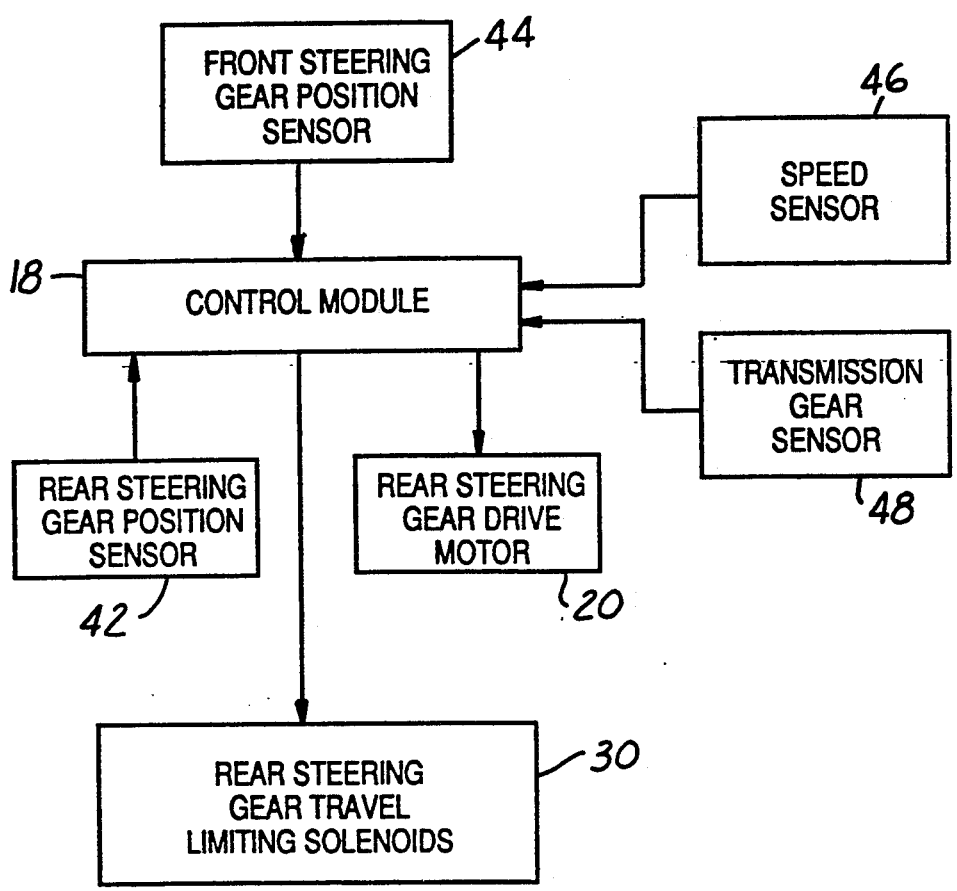
FIG. 3 is a block diagram showing the major component parts of the system according to the present invention.

As is further shown in FIG. 3, control module 18 provides control signals to rear steering gear drive motor 20. In the normal course of events, control module 18 senses the front steering gear position and speed or transmission gear being used and provides a rear steering signal. A number of known control strategies have been employed for determining a desired angular steering position of the rear roadwheels required for any particular front wheel steering position at a given speed or other vehicular operating condition. As an example, it is known to steer the rear wheels in phase at high speeds and out of phase at lower vehicle speeds. At lower vehicle speeds, rear wheel steering is usually subject to a greater angular range of authority. For example, at low speeds, it is known to steer the rear wheels with some systems in excess of 5° from the straight-ahead position. At high speeds, however, the steering of the rear wheels at 5° could seriously impair the stability of the vehicle. The present invention provides a means for positively preventing the steering gear's motor drive or other prime mover from exceeding the maximum steering angle corresponding to a lesser range, for example 1.5° of steering angle, in the event that a threshold speed has been exceeded. Those skilled in the art will appreciate in view of the disclosure that with certain chassis combinations it may be desirable to provide a first threshold, for example, 10 mph, for limiting rear wheel capability in the forward direction, but perhaps a lower threshold, for example, 5 mph, for limiting rear wheel steering while operating the vehicle in the reverse direction.

One example of a limit mechanism for impeding the motion of a rear steering gear according to the present invention comprises the electromechanical travel limiting blocks or solenoids, 30, illustrated in FIG. 2. Each travel limiting solenoid comprises a coil, 32, which acts upon a plunger, 34. Each plunger has a crown 36 applied thereto. The plunger and crown are biased into the blocking position by means of biasing springs 38. Accordingly, in the event that no signal is received by coil 32 from control module 18, each travel limiting solenoid will automatically be urged into the limiting position by means of biasing springs 38. As a result, if the wiring connections between travel limiting solenoids 30 and control module 32 become compromised—e.g., open circuited, the travel limiting solenoids will be automatically applied.

As previously noted, control module 18 will receive vehicle speed information from speed sensor 46 and transmission gear selection information from transmission gear sensor 48. Accordingly, in the event that the vehicle speed is less than a threshold which is appropriate for the chosen direction of movement, whether forward or reverse, travel limiting solenoids 30 will be energized, thereby removing crowns 36 from the path of inner tie rod ends 40. If, however, the vehicle speed exceeds a given threshold appropriate for the direction of movement, power will not be provided to the travel limiting solenoids and, as a result, the maximum steering angle will be limited to a lesser angular range. This control scheme thus operates the rear steering gear as a dual range steering gear with greater and lesser angular ranges of authority, with each range corresponding to a different predetermined maximum rear wheel steering angle. It has been determined that a maximum steering angle of 5° right or left (out of phase) is appropriate for certain passenger vehicles operating at low speeds, whereas the travel limiting mechanism has been useful for limiting the maximum steering angle to 1.5° right or left, (in phase) at higher speeds. Accordingly, once the threshold speed has been exceeded, travel limiting solenoids 30 will be de-energized and crowns 26 will be deployed, with the consequence that steering gear motor 20 will be overridden and will therefore be incapable of steering roadwheels 12 in excess of the limited 1.5° range of authority allowed by the travel limiting solenoids. Limiting the range of authority to 1.5° will allow the driver of the vehicle to maintain control over the vehicle even should the rear steering gear control system fail.

It will be understood that the invention herein is not to be limited to the exact construction shown and described and that various changes and modifications may be made without departing from the spirit and scope of the invention as defined by the appended claims.

We claim:

1. A steering system for the rear wheels of a vehicle having a longitudinal axis, comprising:
   an electric motor driven, dual-range steering gear for steering said rear wheels, with said steering gear being operable within greater and lesser angular steering ranges, with each such angular steering range having a different predetermined maximum steering angle; and
   control means for operating said steering gear, with said control means comprising:
   means for sensing at least one vehicle operating parameter; and
   means responsive to said at least one vehicle operating parameter for permitting said steering gear to extend only to the maximum steering angle of said lesser angular steering range in the event that a threshold of said at least one vehicle operating parameter has been exceeded, said means comprising at least one electromechanical travel limiting block adapted to positively engage a sliding member contained within said steering gear so that when said at least one vehicle operating threshold has been exceeded, said travel limiting block engages said sliding member to permit said steering gear to extend only to said maximum steering angle of said lesser angular steering range.

2. A steering system according to claim 1, wherein said at least one vehicle operating parameter comprises the velocity of said vehicle, so that the steering capability of said motor drive will be limited according to the velocity of said vehicle.

3. A steering system according to claim 1, wherein said at least one vehicle operating parameter comprises the transmission gear in which the vehicle is being operated, so that the steering capability of said motor drive will be limited according to a transmission operating condition.

4. A steering system according to claim 1, wherein said at least one vehicle operating parameter comprises the velocity of said vehicle, as well as the transmission gear in which the vehicle is being operated, so that the steering capability of said motor drive will be limited according to the velocity of said vehicle and according to the transmission gear in which the vehicle is being operated.

5. A steering system according to claim 1, wherein said steering gear comprises an electric motor driving a gearset operatively connected with said wheels.

6. A steering system according to claim 2, wherein the magnitude of said threshold vehicle speed is dependent upon the direction of travel of said vehicle.

7. A steering system according to claim 1, wherein said at least one electromechanical travel limiting block comprises a solenoid including a coil, a plunger, a crown disposed on said plunger and adapted to engage said sliding member, and a biasing spring.

8. A steering system according to claim 1, wherein said maximum steering angle of said greater angular steering range extends five degrees laterally from the longitudinal axis of said vehicle.

9. A steering system according to claim 1, wherein said maximum steering angle of said lesser angular steering range extends one and one-half degrees laterally from the longitudinal axis of said vehicle.

10. A steering system for the rear wheels of a vehicle, comprising:
an electric motor driven, dual-range steering gear for steering said rear wheels in response to steering of the front wheels of said vehicle, with said steering gear being operable within greater and lesser angular steering ranges, with each such angular steering range having a different predetermined maximum steering angle; and
control means for operating said steering gear, with said control means comprising:
means for sensing the steering angle of said front wheels;
means for sensing the speed of said vehicle; and
limiting means responsive to said sensed vehicle speed for permitting said steering gear to extend only to the maximum steering angle of said lesser angular steering range in the event that a threshold speed has been exceeded, said means comprising at least one electromechanical travel limiting block adapted to positively engage a sliding member contained within said steering gear so that when said threshold speed has been exceeded, said travel limiting block engaging said sliding member to permit said steering gear to extend only to said maximum steering angle of said lesser angular steering range.

11. A steering system according to claim 10, wherein the magnitude of said threshold vehicle speed is dependent upon the direction of travel of said vehicle.

* * * * *